P. CROSLEY, Jr.
STEERING ATTACHMENT.
APPLICATION FILED JAN. 3, 1916.
1,214,651.
Patented Feb. 6, 1917.
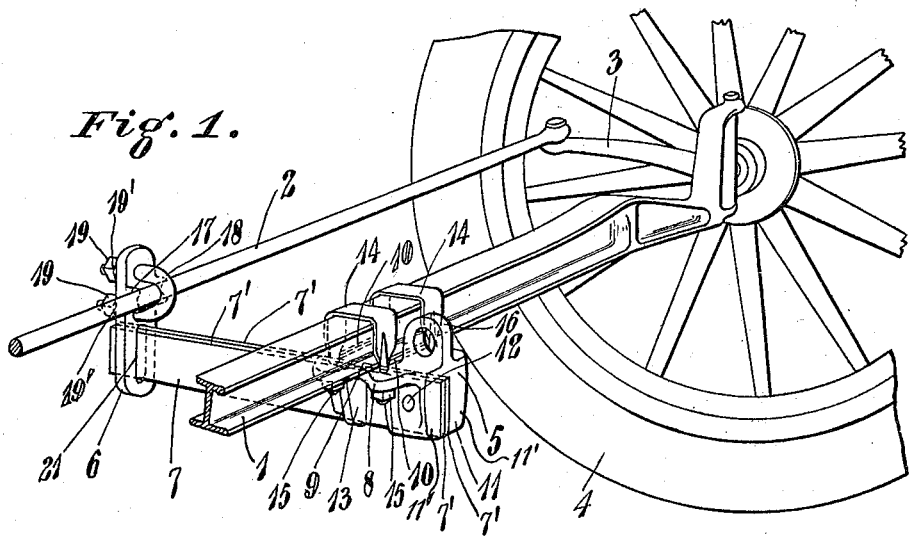
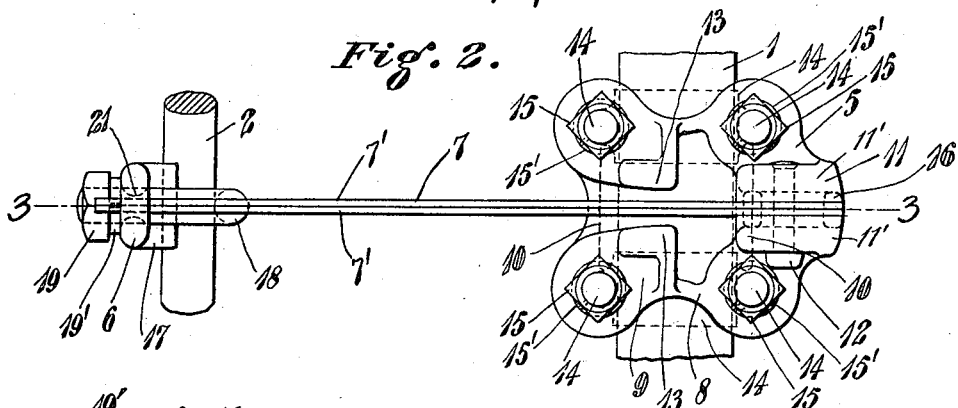
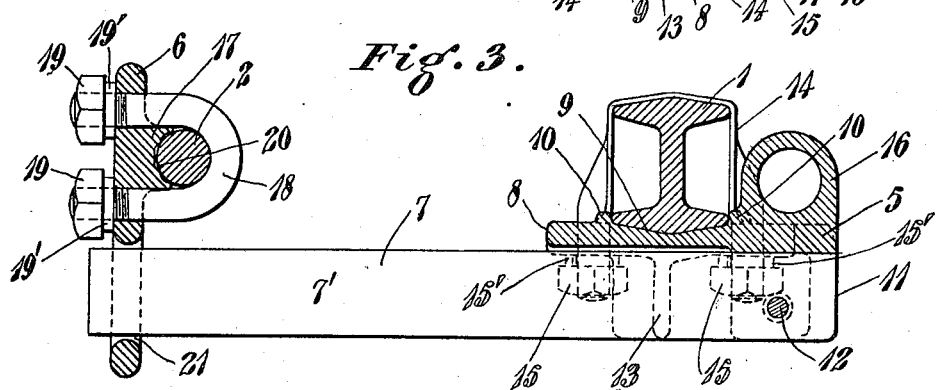
Witnesses:
Clarence Perdew
Arend Parker
Inventor
Powel Crosley Jr.
By James N. Ramsey
Attorney
THE NORRIS PETERS CO., PHOTO LITHO., WASHINGTON, D. C.

UNITED STATES PATENT OFFICE.

POWEL CROSLEY, JR., OF CINCINNATI, OHIO.

STEERING ATTACHMENT.

1,214,651. Specification of Letters Patent. Patented Feb. 6, 1917.

Application filed January 3, 1916. Serial No. 69,929.

*To all whom it may concern:*

Be it known that I, POWEL CROSLEY, Jr., a citizen of the United States, and a resident of Cincinnati, in the county of Hamilton and State of Ohio, have invented certain new and useful Improvements in Steering Attachments, of which the following is a specification.

My invention relates to motor vehicles and its object is to facilitate return of the steering apparatus to mid-position when it has been turned to one side or the other.

My invention consists in the combination of parts and in the details of construction and arrangement of parts as will herein be more fully described and claimed.

In the drawing: Figure 1 is a general perspective view of parts of the steering apparatus of a motor vehicle provided with my invention; Fig. 2 is a bottom plan view of my invention and parts of the vehicle to which it is connected; and Fig. 3 is a longitudinal vertical section of the same on the line 3—3 of Fig. 2.

As I show my invention herein, it is designed to be mounted on a motor vehicle comprising the front axle 1 and the rod 2 which connects to the spindle-arm 3 of the front wheel 4. As is well understood, this rod 2 connects such arms 3 for both front wheels at opposite sides of the vehicle, the other wheel and arm not being shown. For this purpose, my invention comprises the bracket 5 secured on the axle 1, the stirrup 6 secured on the rod 2, and a flat leaf spring 7 with its edges upward and downward, and with one end part fixed in the bracket 5 and the other end part engaging with the stirrup 6 when the stirrup, with the rod 2, moves either to the right or to the left. Thus the spring 7 will be deflected by such movement, and, due to its resiliency, it will tend to return the rod 2 and the other parts of the steering apparatus to mid-position, in which position the spring will not be subjected to any deflecting strain.

I prefer to compose the spring 7 of two separate thicknesses or leaves 7', so that the strength of both thicknesses is availed of in acting upon the steering mechanism, but whereby the spring is as flexible as either one of its leaves 7' acting alone. It will be understood that these leaves 7' are not attached together at any place except where the complete spring is fixed in the bracket 5. Thus, the leaves 7' may slide upon each other during deflection, so that the two parts of the spring may be deflected unequal amounts, which would not be permissible if a single piece of resilient material of the thickness of the two leaves 7' were used.

By the above provision, I am enabled to make my device very simple, yet at the same time very durable; because the two thin spring parts may be flexed many more times than might an equally thick single part without breaking. I further add to the security and durability of the device by providing secondary fulcrums near the fastening or primary fulcrum of the spring 7 in the bracket 5, at opposite sides of the spring, one or the other of which is engaged after the spring 7 has been deflected some distance in either direction. Thus, the initial flexure of the spring is greatest near the primary fulcrum, and then upon its engagement with the secondary fulcrum after the initial flexure, the greatest flexure comes adjacent to the engaging means, *i. e.*—at a different place along the spring. Thus, there is far less destructive effect on the spring near its fastening in the bracket than if this were the fulcrum at all times, throughout every deflection of the spring.

With the above ends in view, the preferred construction of the bracket 5 comprises the main part 8 with a transverse depression 9 flanked by transverse ribs 10 to form a channel fitting up around the lower side of the vehicle axle 1. A downwardly extending lug 11 is on the front end of the part 8, divided by a slot in its middle and receiving the forward end part of the spring between its division 11', and having suitable fastening means, such as the rivet 12, passing through its divisions 11' and through the spring, thus securing the spring to the bracket in such a manner that it is effectively supported on both sides, and forming the primary fulcrum as above described. The spring 7 extends backward with its upper edge very close to the under side of the part 8, and the bracket 5 has in its rear part the downwardly extending lugs or secondary fulcrums 13 flanking the springs 7, and each a short distance away from it when the spring is in its normal straight mid-position. The sides of these lugs 13 adjacent to the spring 7 preferably flare apart rearwardly, as is best seen in Fig. 2, so that they give proper freedom of flexure and at the same time the best lateral support to the spring during its increasing deflection while these lugs 13 are acting as the secondary fulcrums.

I prefer to secure the bracket 5 to the axle 1 by means of suitable U-bolts 14 passing down over the axle 1 and through openings in the main part 8 of the bracket at opposite sides of the spring 7 and lugs 11 and 13, and receiving nuts 15 and lock-washers 15' up against the lower side of the part 8. The bracket 5 may have an eye 16 to which the vehicle starting-crank may be locked.

The stirrup 6 comprises an upper main part with a forwardly projected transversely channeled lug 17 fitting against the rear side of the rod 2, and a U-bolt 18 is slipped over the rod 2, straddling the channeled lug 17 and passing backward through openings in the main part of the stirrup and receiving nuts 19 and lock-washers 19' against the rear side of the stirrup. The channeled part of the lug 17 preferably has a series of longitudinal grooves 20 to increase its friction with the rod 2 and prevent turning of the stirrup on the rod. The lower part of the stirrup has the vertical slot 21 which receives the rear end part of the spring 7, preferably being somewhat longer and wider than is the cross section of the two leaves 7' of the spring 7, so that there is ample articulation between the spring and the stirrup during operation.

It will be seen that the movements of the stirrup 6 and spring 7 relative to each other are the only relative movements in the entire device, excepting the deflection of the spring itself and the relative movements of its two leaves, which latter, as above pointed out, is more desirable than the absence of any relative movement between the two sides of the spring, as were the spring made all in one piece. By thus minimizing the parts which have relative movements, not only is the wear reduced, but the liability to become locked, or clogged with ice or mud is practically all eliminated. Furthermore, due to the fewness of parts, the device does not become dangerous if any part of it is broken during operation, as might be the case with a more complicated device, which, by some of its parts becoming misplaced, might bind the steering mechanism in such position as to render the driver of the vehicle powerless to steer the vehicle in a safe direction.

Having fully described my invention, what I claim as new and desire to secure by Letters Patent is:

1. In a steering attachment, a primary fulcrum, an attenuated spring secured by said fulcrum near one end, engaging means to engage in either direction with said spring near its other end, secondary fulcrums flanking said spring, and means for securing said fulcrums to one and said engaging means to another of relatively movable parts of a vehicle, one of said parts being a part of the steering apparatus of the vehicle.

2. In a steering attachment, a primary fulcrum, a flat spring secured by said primary fulcrum near one end, engaging means to engage in either direction with said spring near its other end, secondary fulcrums flanking said spring but spaced away from the spring to allow initial deflection of the spring before it engages with the secondary fulcrums, a bracket on which said primary fulcrum and said secondary fulcrums are fixed, and means for securing said bracket and said engaging means to relatively movable parts of a vehicle, one of said parts being a part of the steering apparatus of the vehicle.

3. In a steering attachment, a primary fulcrum, an attenuated spring secured by said primary fulcrum near one end, engaging means to engage in either direction with said spring near its other end, secondary fulcrums flanking said spring but spaced away from the spring to allow initial deflection of the spring before it engages with the secondary fulcrums, and being flared apart along the spring in direction away from the primary fulcrum to support the spring laterally during its increasing deflection, a bracket on which said primary fulcrum and said secondary fulcrums are fixed, means for securing said bracket and said engaging means to relatively movable parts of a vehicle, one of said parts being a part of the steering apparatus of said vehicle.

POWEL CROSLEY, Jr.

Witnesses:
 CLARENCE PERDEW,
 CATHERINE DORAN.

Copies of this patent may be obtained for five cents each, by addressing the "Commissioner of Patents, Washington, D. C."